June 21, 1966   J. T. PETIT, JR   3,256,859
ANIMAL CAGE FEEDING LID
Filed April 13, 1965   3 Sheets—Sheet 1
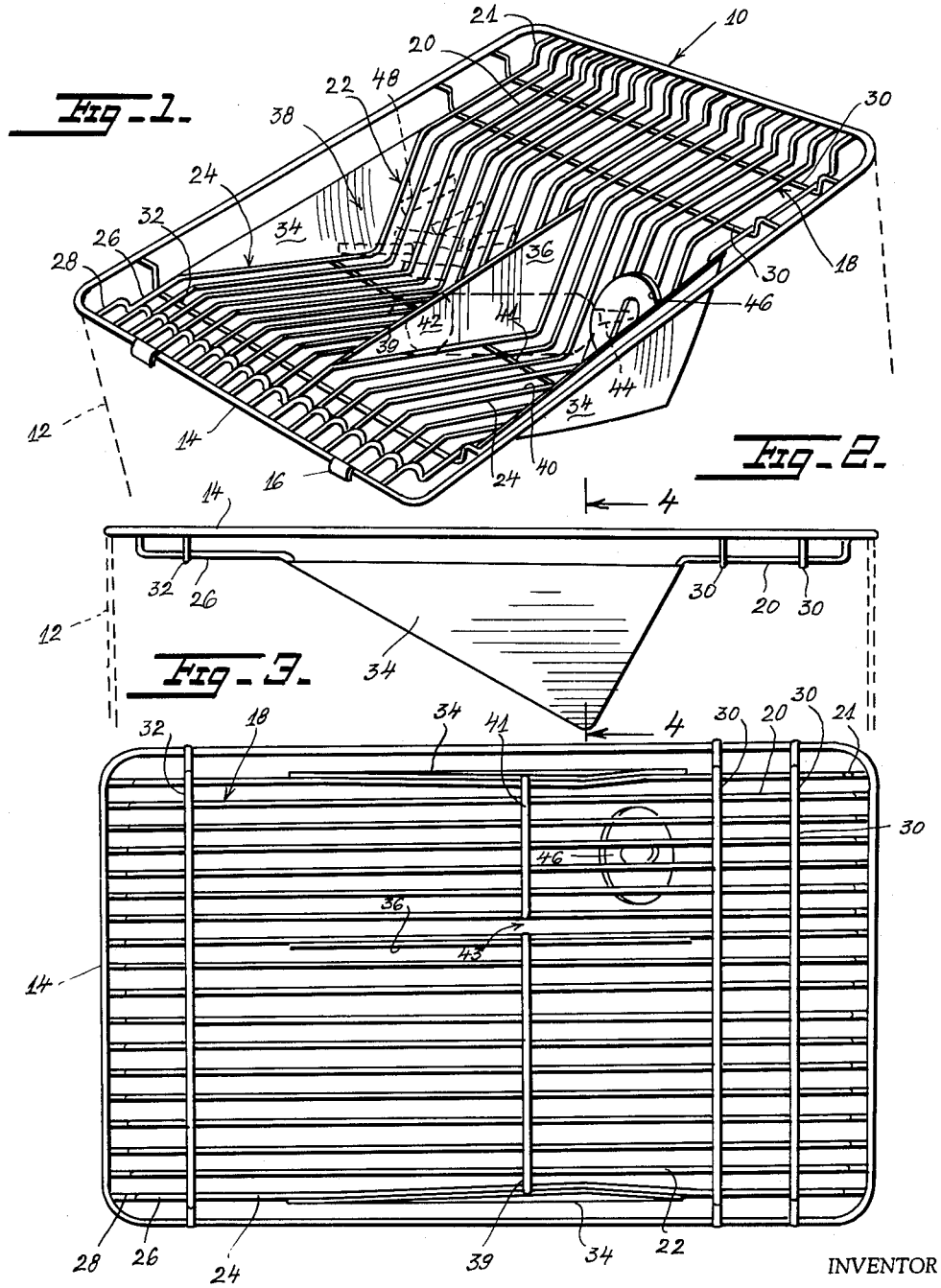
INVENTOR
Joseph T. Petit, Jr.

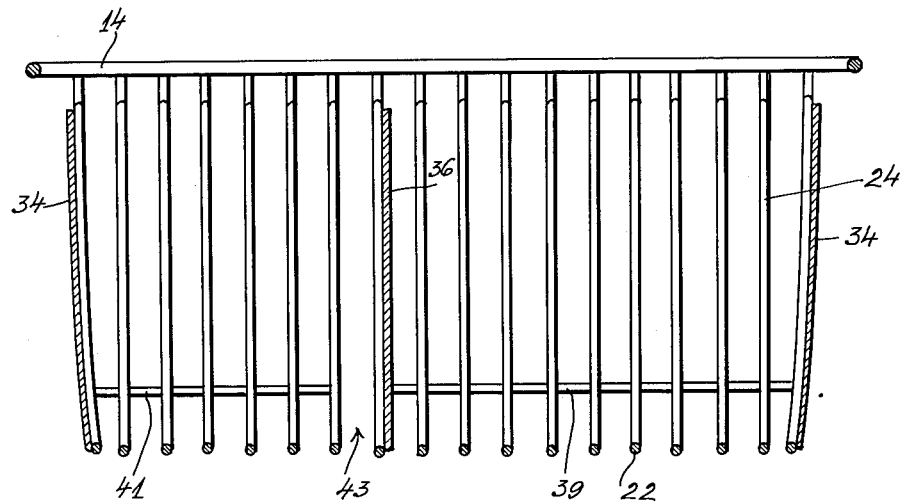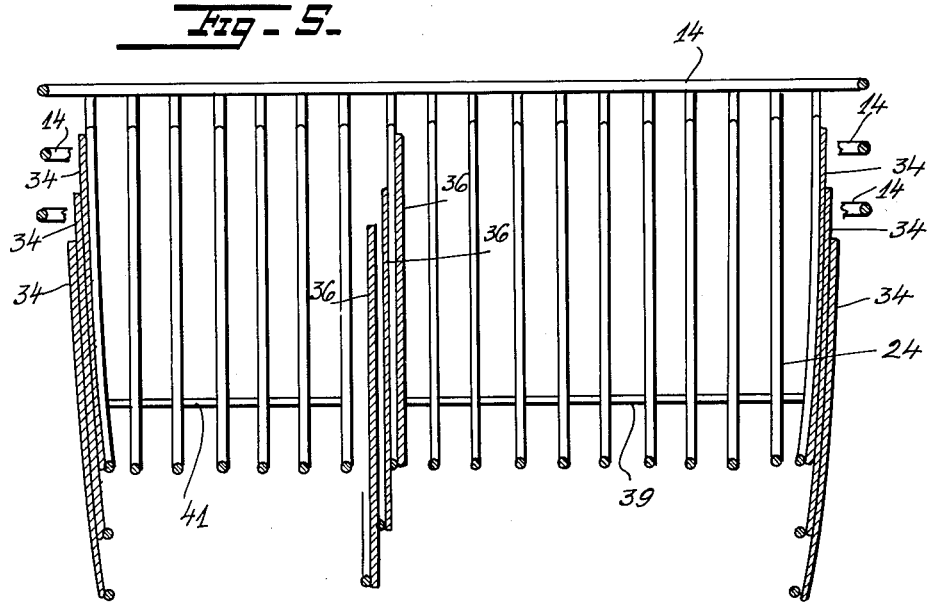

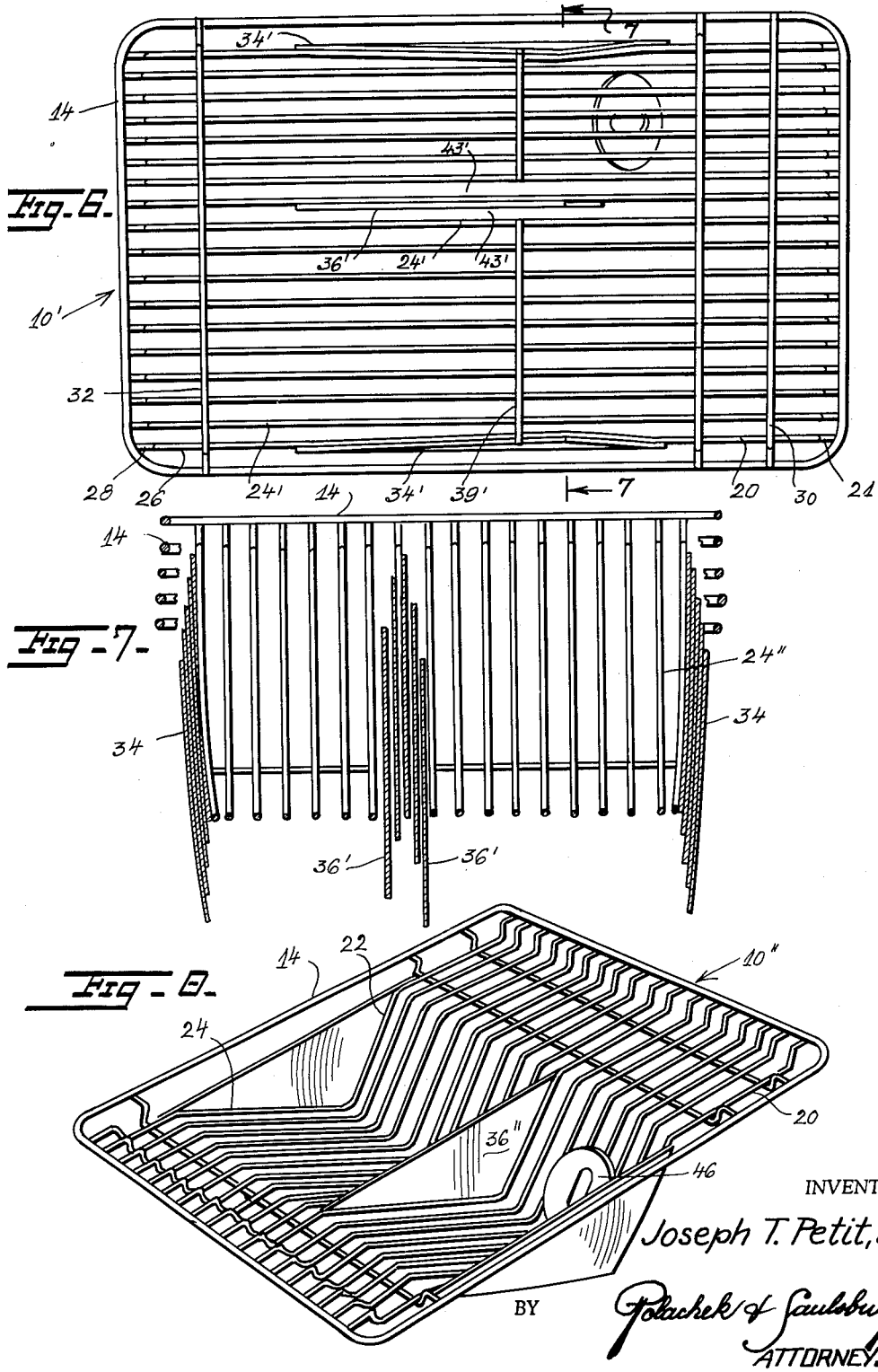

United States Patent Office

3,256,859
Patented June 21, 1966

3,256,859
ANIMAL CAGE FEEDING LID
Joseph T. Petit, Jr., International Aquarium Inc., Northern Bernstein Blvd., P.O. Box 1244, Center Moriches, Long Island, N.Y.
Filed Apr. 13, 1965, Ser. No. 447,732
3 Claims. (Cl. 119—18)

The present invention relates generally to animal cages and more particularly to an improved lid for an animal cage.

Experimental animals are usually kept in special cages in laboratories so that their reactions to certain experiments may be observed. The cages are provided with suitable feed baskets for solid food so that the animals may feed therefrom, and they are also provided with means for supplying water to the animals.

Heretofore in the prior art, the lids of such animal cages have been manufactured separately from the feed basket and the holder for the water containers. This necessitated the assembly of the several parts together to form the lid which is time consuming and expensive. Furthermore making the component parts separately does not provide for a sturdy structure.

Further, in the lids for animal cages with which applicant is aware the angular shape of component parts are such that the lids cannot be stacked for shipment.

It is an important object of the present invention to overcome these disadvantages by providing a lid for an animal cage wherein the feed basket and holder for the water container are integrally formed.

Another object of the invention is to provide a lid for an animal cage that is so shaped that it can easily and conveniently be stacked for shipment thereby reducing the cost of shipping.

Yet another object of the invention is to provide a lid for an animal cage which will be open to provide adequate circulation of air.

A further object of the invention is to provide a lid for an animal cage that is simple in construction and economical to manufacture.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a perspective view of an animal cage lid embodying one form of the present invention showing its position when it is mounted on an animal cage, FIG. 2 is a side elevational view of the lid, FIG. 3 is a top plan view thereof, FIG. 4 is a vertical sectional view taken on the line 4—4 of FIG. 2, FIG. 5 is a similar view showing a number of lids in stacked relation, FIG. 6 is a view similar to FIG. 3 of a lid embodying a modified form of the invention, FIG. 7 is a vertical sectional view taken on the line 7—7 of FIG. 6, and FIG. 8 is a top perspective view of a lid embodying still another modified form of the invention.

Referring now in detail to the various views of the drawings, in FIG. 1 a lid 10 embodying one form of the invention is shown in position on an animal cage 12 shown diagrammatically in dotted lines. The lid 10 is preferably formed from open deformable material, such as zinc plated wire so that the material can be easily worked to the desired shape. The lid includes a rectangular shaped rim 14 formed of wire of heavy stock, which rim seats on the top of the animal cage 12 and is fastened thereon by fasteners 16. A cover portion 18 spans the rim and is attached thereto, at its ends, by welding or soldering. The cover portion 18 is formed from wire of lighter stock than the rim. This cover portion 18 includes an elongated horizontal straight wire portion 20 connected at one end to the rim 14 by means of a short horizontal straight wire portion 21 offset from the plane of the portion 20 and welded to the end of the rim. The elongated straight wire portion 20 continues toward the other end of the rim and, at a point remote from the midlength of the rim, dips downwardly as seen in FIG. 1 at an acute angle of the order of 30° as indicated at 22, and then slants upwardly at an obtuse angle of the order of 60° as indicated at 24, and continues from a point closely spaced from the other end of the rim in a straight portion again as indicated at 26, terminating in a short straight portion 28 offset from the plane of the adjacent straight portion 26, the straight portion 28 being welded to the other end of the rim 14. The upwardly slanting angular portion 24 is substantially twice the length of the downwardly slanting portion 22. Spaced cross-wires 30 are welded to the bottoms of the wires of the elongated straight portion 20 and a single cross-wire 32 is welded to the bottom of the wires of the short straight portion 26. These cross-wires reinforce the lid. The rim 14 is slightly above the cover portion 18, as best seen in FIG. 2. A triangular shaped sheet metal plate 34 is suitably fastened along adjacent edges thereof to the sidemost wires of the downwardly and upwardly slanting portions 22 and 24, respectively, the free edge of the plate being flush with the straight wire portions 20 and 26, and it will be noted that they curve slightly inwardly from their broad ends to their narrow ends as best seen in FIGS. 4 and 5. These plates 34 serve as closure side walls. A plate 36 similar in shape to the plates 34 is similarly secured to one of the wires comprising the slanting portions 22 and 24, intermediate the sides of the cover portion 18. The plate 36 serves as a partition plate, dividing the space defined by the slanting wires and the side closure plates into a feed basket 38 and a holder or compartment 40 for a liquid or water container 42 shown in the drawing in the form of a bottle having a feed tube 44 extending through a slotted metal disc 46 welded flatwise to the wires of the slanting wires 22 of the holder. The feed basket 38 is reinforced by means of a transverse wire 39 extending across the wires 24 closely spaced from the juncture of the wires 24 and wires 22, the wire 39 extending from the partition wall 36 to one side closure wall 34. The holder or compartment 40 for holding the water container 42 is also reinforced by a similar transverse wire 41 in line with the wire 39 of the food basket. Wire 41 however extends from the other side closure wall 34 only to the wire 24 adjacent the wire 24 mounting the partition wall 36, as best seen in FIG. 4 thereby leaving a clearance 43 to permit stacking of the lids. With this structure, the animals may feed on the solid particles of food 48 from the basket 38 and may obtain water from the water container 42 through the feed tube 44. The metal disc prevents gnawing of the feed tube 44. The feed basket 38 is shown as integrally formed with the cover portion 18 and as being located between the ends of the cover portion and in transverse position with respect to the longitudinal axis of the lid.

In operation, the lid 10 is first mounted on the animal cage 12. Solid food 48 is placed in the feed basket 38. The spacing between the wires of the basket is such that an animal in the cage may remove particles of food from the feed basket when it is feeding. Also the space comprising the holder or compartment 40 permits a water container such as the bottle 42 to be held therein with its feed tube 44 inserted through the slot in the disc 46 into the interior of the cage convenient for the animals to drink therefrom.

By reason of the clearance 43 provided at the side of the partition wall 36 and by reason of the curved side closure walls 34, a number of lids 10 can be readily stacked, the clearance permitting the slanting wires 24 to be superimposed upon one another, and the curvature of the side closure walls 34 permitting said walls to be juxtaposed as shown in FIG. 5. This saves space in shipping with resulting saving of expense.

The modified form of lid 10' shown in FIGS. 6 and 7 differs from the lid 10 merely in that the transverse wire 39 extends from the side closure wall 34' only to the wire 24' adjacent the wire 24' mounting the wall 36' instead of extending to the latter wire. This leaves a clearance 43' on both sides of the partition wall 36' resulting in a greater flexibility in the stacking operation. With clearances on both sides of the partition plate, some of the partition walls 36' of the superimposed lids may clear through the clearance on one side and others on the other side as shown in FIG. 7.

It will also be understood that the lids 10 and 10' of FIGS. 1 and 6, respectively, might be further modified by terminating the transverse wires 39, and 41 of FIG. 3 and wire 39' of FIG. 6, at the wires 24 adjacent the wires 24 mounting the side walls 34, thereby leaving a clearance between said wires 24 to facilitate stacking of such further modified lids.

In the modified form of lid 10" shown in FIG. 8, the reinforcing transverse wires such as the wires 39 and 41 of lid 10 are omitted entirely so that clearance is provided on both sides of the partition wall 36" for receiving the partition walls of the stacked superimposed lids as will be understood.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. An animal cage lid comprising a rectangular shaped wire rim, a cover portion of spaced wires supported on said rim and spanning the area between the ends and sides of the rim, said cover portion having a horizontally disposed straight portion and an angular depressed portion, sheet metal plates mounted on the sidemost wires of the depressed portion constituting solid side closure walls, a sheet metal partition wall mounted on one wire of the depressed portion intermediate the sides thereof, said partition wall dividing the depressed portion into a feed basket and a holder for a water container in side by side relation, a slotted disc supported on the wires of the holder for receiving the feed tube of a bottle positioned in said holder containing liquid, and spaced transverse wires extending across the wires of the straight portion of the cover portion, and aligned transverse wires extending across the angular depressed portion, one aligned wire extending from one side of the cover portion to the wire mounting the partition wall, the other aligned wire extending from the other side of the cover portion to the wire adjacent the wire mounting the partition wall thereby leaving a clearance between said mounting wire and said adjacent wire for receiving partition walls of stacked lids.

2. An animal cage lid comprising a rectangular shaped wire rim, a cover portion of spaced wires supported on said rim and spanning the area between the ends and sides of the rim, said cover portion having a horizontally disposed straight portion and an angular depressed portion, sheet metal plates mounted on the sidemost wires of the depressed portion constituting solid side closure walls, a sheet metal partition wall mounted on one wire of the depressed portion intermediate the sides thereof, said partition wall dividing the depressed portion into a feed basket and a holder for a water container in side by side relation, a slotted disc supported on the wires of the holder for receiving the feed tube of a bottle positioned in said holder containing liquid, and spaced transverse wires extending across the wires of the straight portion of the cover portion, and aligned transverse wires extending across the angular depressed portion, one aligned wire extending from one side of the cover portion to the wire adjacent the wire mounting the partition thereby leaving a clearance between said mounting wire and said adjacent wire, the other aligned wire extending from the other side of the cover portion to the wire adjacent the wire mounting the partition wall thereby leaving a clearance between said mounting wire and said latter adjacent wire, said clearance adapted to receive partition walls of stacked lids.

3. An animal cage lid comprising a rectangular shaped wire rim, a cover portion of spaced wires supported on said rim and spanning the area between the ends and sides of the rim, said cover portion having a horizontally disposed straight portion and an angular depressed portion, sheet metal plates mounted on the sidemost wires of the depressed portion constituting solid side closure walls, a sheet metal partition wall mounted on one wire of the depressed portion intermediate the sides thereof, said partition wall dividing the depressed portion into a feed basket and a holder for a water container in side by side relation, a slotted disc supported on the wires of the holder for receiving the feed tube of a bottle positioned in said holder containing liquid and spaced transverse wires extending across the wires of the straight portion of the cover portion, said angular depressed portion being free of transverse wires so that a number of lids may be stacked in superimposed position.

References Cited by the Examiner

UNITED STATES PATENTS

| | | | |
|---|---|---|---|
| 2,467,525 | 4/1949 | Fricke | 119—15 |
| 3,002,492 | 10/1961 | Naturale | 119—18 |

SAMUEL KOREN, *Primary Examiner.*

HUGH R. CHAMBLEE, *Examiner.*